United States Patent [19]

Grevich

[11] 4,142,427
[45] Mar. 6, 1979

[54] PRESSURE SENSITIVE CONTROL OF INPUT PRESSURE TO TRANSMISSION VACUUM MODULATOR

[76] Inventor: John D. Grevich, 32011 S. Coast Hwy., South Laguna, Calif. 92677

[21] Appl. No.: 817,360

[22] Filed: Jul. 20, 1977

[51] Int. Cl.² .................. B60K 41/18; F02B 33/00
[52] U.S. Cl. .......................... 74/863; 123/119 CE
[58] Field of Search .............. 74/863, 864, 843, 844; 60/605; 123/119 CE

[56] References Cited

U.S. PATENT DOCUMENTS

| | | | |
|---|---|---|---|
| 2,556,190 | 6/1951 | Jorgensen et al. | 123/119 CE X |
| 2,589,788 | 3/1952 | Fell | 123/119 CE |
| 3,106,104 | 10/1963 | Harry | 74/863 X |
| 3,295,388 | 1/1967 | Groves | 74/844 |
| 3,436,989 | 4/1969 | Krieg et al. | 74/864 |
| 3,566,718 | 3/1971 | Wightman | 74/863 |
| 3,827,315 | 8/1974 | Lupo | 74/863 |

Primary Examiner—Lance W. Chandler
Attorney, Agent, or Firm—Christie, Parker & Hale

[57] ABSTRACT

An accessory is provided for a vehicle having a transmission vacuum modulator and an engine equipped with a supercharging device such as a turbocharger that temporarily boosts intake manifold pressure above atmospheric pressure. The accessory normally provides a communication path for use in coupling a manifold port to a vacuum modulator port so that variations in intake manifold pressure serve as an input signal to the vacuum modulator. The accessory provides for comparing intake manifold pressure with a reference pressure, and, when the manifold pressure exceeds the reference pressure, the communication path is interrupted.

10 Claims, 3 Drawing Figures

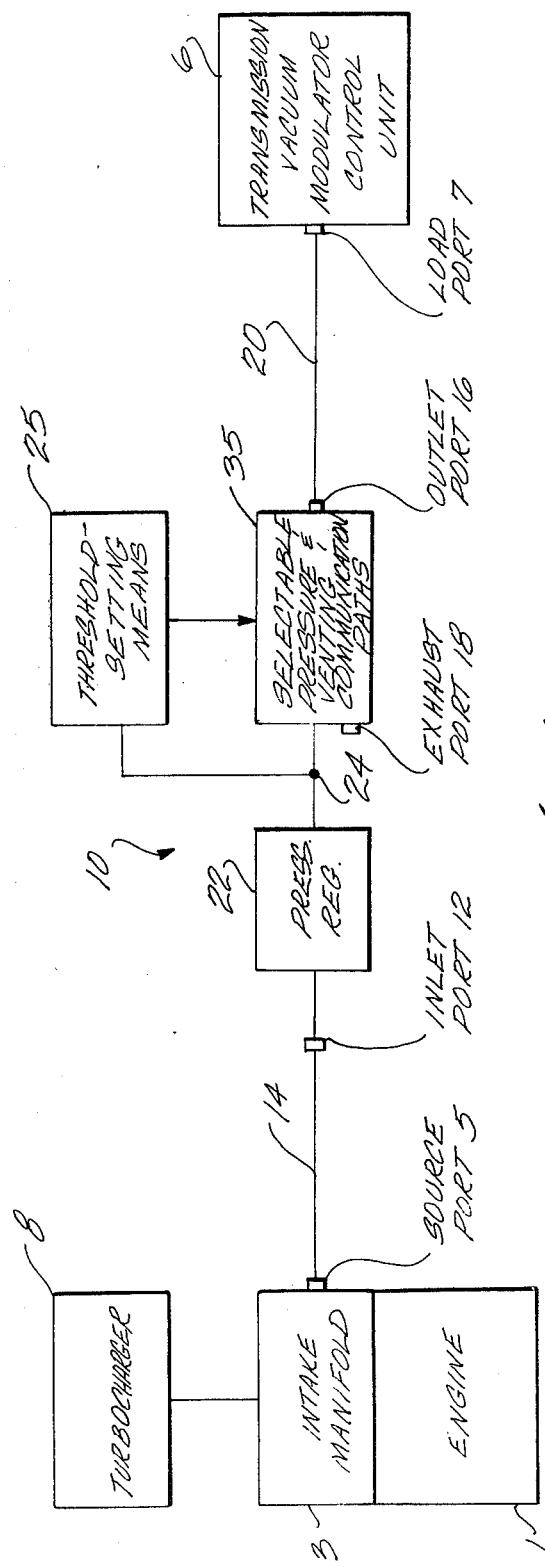

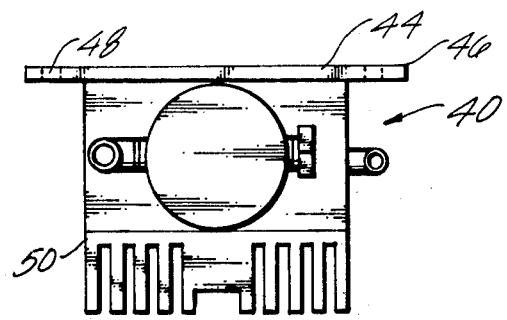
*Fig. 3*
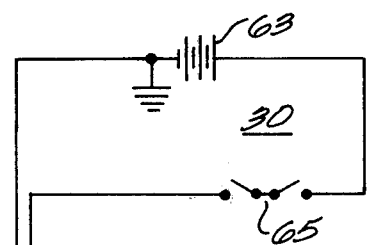
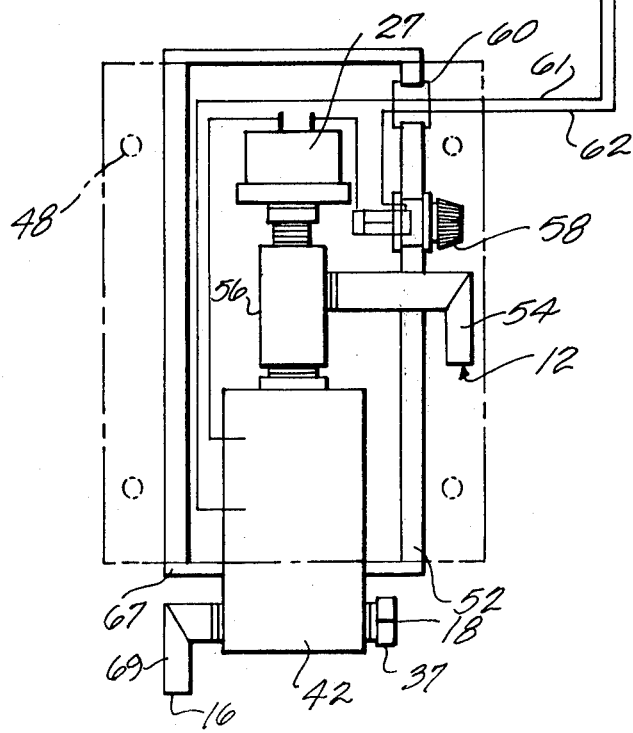
*Fig. 2*

PRESSURE SENSITIVE CONTROL OF INPUT PRESSURE TO TRANSMISSION VACUUM MODULATOR

BACKGROUND OF THE INVENTION

In general, this invention relates to systems for controlling automatic transmissions. More particularly, it relates to an accessory for controlling the effect of intake manifold pressure on a transmission vacuum modulator control unit.

It is a conventional practice to employ a vacuum modulator control unit (vacuum modulator) to control the shifting of an automatic transmission. The vacuum modulator has a port, referred to herein as a load port, for receiving a pressure signal. Within the vacuum modulator there is a diaphragm against which the pressure signal acts and a valving arrangement responsive to the diaphragm for controlling line pressure in a hydraulic circuit involved in controlling the shifting of the transmission.

Conventionally, the load port is coupled by a vacuum line to a port, referred to herein as a source port, in the intake manifold of the engine.

In a naturally aspirated engine, the intake manifold pressure is, during idle or during deceleration conditions, quite low. Expressed equivalently, intake manifold vacuum is quite high during such operating conditions. When the throttle is opened to cause the engine to develop more power, the intake manifold pressure increases to a level slightly below the ambient atmospheric pressure.

Vacuum modulators, although differing in design detail from one manufacturer to another, are commonly designed so that the vacuum modulator is compatible with variations of intake manifold pressure within the foregoing range in fulfilling its role in controlling the proper shifting of the transmission.

In contrast to a naturally aspirated engine, an engine equipped with a supercharging device such as a turbocharger has temporary periods of operation during which intake manifold pressure exceeds ambient atmospheric pressure. Whereas boosting intake manifold pressure has proven advantageous for the purpose of maximizing engine output power, it has produced adverse side effects on the vacuum modulator operation. These adverse side effects include the occurrence of undesired downshifts at high engine and vehicle speeds; of delays in upshifts, especially at wide open throttle; harsh shifting; undesirably high operating pressure in the internal hydraulic circuit; internal damage to the transmission and overreving of the engine causing engine damage and turbocharger failure; and possible damage to the vacuum modulator.

There have been proposed a number of approaches directed to solving this problem, but none have proved satisfactory. According to one of these unsatisfactory approaches, there is provided, among other things, a check valve that is connected by vacuum lines between the source port and the load port. The check valve by itself protects the vacuum modulator against damage that might otherwise occur from having a positive (i.e., higher than atmospheric) pressure applied to its load port. However, introducing such a check valve creates other problems. One such other problem relates to the need to bleed the vacuum line that connects the check valve to the load port. Unless such bleeding is provided for, the check valve will in normal operating conditions, close at the point of highest vacuum and remain closed thereby trapping high vacuum in the vacuum modulator while intake manifold pressure varies within its non-supercharged range, thereby undesirably precluding the vacuum modulator from responding to intake manifold pressure. In view of this, there has been provided in accordance with this prior art approach a separate vacuum line. This separate vacuum line is connected at one of its ends to a tap or T connection located between the check valve and the vacuum modulator, and at its opposite end to the inlet side of the compressor within the turbocharger. In this arrangement, the operation of the vacuum modulator is undesirably influenced by the pressure at the turbo inlet side of the compressor, with the adverse result that the shift points of the transmission are inaccurate. Separately, there are adverse effects on the engine.

According to another unsatisfactory approach, there is provided a bypass assembly having a bore therethrough to provide a continuous communication path for use in coupling the source port to the load port. The accessory has an exhaust port communicating with the continuous communication path, and a flexible flap which normally covers the exhaust port but which is forced away therefrom when the pressure in the bore exceeds atmospheric pressure. This causes the highly combustible vapor from the intake manifold to be vented into the engine compartment and accordingly creates a hazardous condition.

SUMMARY OF THE INVENTION

This invention is directed to an accessory for overcoming the above-described adverse side effects with an arrangement that is simple in construction, and safe and reliable in operation.

The accessory is for a vehicle having a vacuum modulator, an engine with an intake manifold, and means for causing the intake manifold pressure to temporarily exceed atmospheric pressure. The intake manifold and the vacuum modulator respectively have a source port and a load port for use in coupling the intake manifold to the vacuum modulator.

Broadly, the accessory comprises controllable means for normally providing a communication path for use in coupling the source port to the load port, and pressure comparison means responsive to the intake manifold pressure for causing the controllable means to interrupt the communication path when the intake manifold pressure exceeds the reference pressure.

In a preferred embodiment of the accessory, there is provided a inlet port for coupling to the source port, an outlet port for coupling to the load port, and an exhaust port. Controllable means selectively provides either a pressure communication path or a venting communication path. During a first mode of operation, the pressure communication path is provided to enable the intake manifold pressure to be applied to the vacuum modulator. During a second mode of operation, the venting communication path is provided to enable atmospheric pressure to be applied to the vacuum modulator. Threshold-setting means responds to the intake manifold pressure to cause the controllable means to operate in the first mode of operation while the intake manifold pressure is less than a predetermined threshold and to operate in the second mode of operation while the intake manifold pressure is greater than a predetermined threshold.

Preferably, the controllable means comprises a solenoid valve and the threshold-setting means comprises a pressure switch. Preferably, there is provided a case for containing the solenoid valve and the pressure switch, the case having a heat-sink portion for dissipating heat generated by the solenoid valve.

Other advantageous and distinguishing features of the present invention are emphasized in the claims which follow the detailed description below.

BRIEF DESCRIPTION OF THE DRAWINGS

FIG. 1 is a block diagram depicting the general arrangement of a portion of a system for controlling an automatic transmission, the system including an accessory embodying the present invention;

FIG. 2 is a plan view of an accessory embodying the invention; and

FIG. 3 is an elevation view of the accessory of FIG. 2.

DETAILED DESCRIPTION

With reference to the system depicted in the block diagram FIG. 1, an engine 1 in a vehicle (not shown) has an intake manifold 3 with a source port 5. The vehicle has a transmission vacuum modulator control unit 6 to assist in controlling the automatic shifting of an automatic transmission (not shown). Vacuum modulator 6 has a load port 7.

Engine 1 is equipped with a supercharging device such as turbocharger 8 that temporarily boosts intake manifold pressure above atmospheric pressure. As an example of a turbocharger that is in wide use today is a turbocharger manufactured by Air Research under the designation Model TO4. Whereas a naturally aspirated engine typically operates with an intake manifold vacuum in the range of approximately 0 inch Hg to 24 inches Hg below atmospheric pressure, engine 1 can have its intake manifold pressure rise positively considerably above atmospheric pressure.

An accessory generally indicated at 10 has an inlet port 12 that is provided for use in coupling accessory 10 to source port 5 by a vacuum line 14. Accessory 10 has two other ports, these being an outlet port 16 and an exhaust port 18. Outlet port 16 is provided for use in coupling accessory 10 to load port 7 by a vacuum line 20.

Depending upon the ratings of other components used in accessory 10, it may be desirable to include therein a pressure regulator 22. A suitable pressure regulator is manufactured by Watts Fluid Power Division, Watts Regulator Company, Lawrence, Massachusetts under the designation 161-1.

If pressure regulator 22 is used, it is connected between inlet port 12 and a three-way fitting 24. Otherwise, fitting 24 is directly coupled to inlet port 12.

Fitting 24 provides a tap to enable a threshold-setting means 25 to sense the pressure level of the vapor extending to the tap from intake manifold 3. In the presently preferred embodiment, threshold-setting means 25 comprises a pressure switch 27 (FIG. 2) that compares the pressure present at the tap against a reference pressure and that includes a single pole electrical switch (not separately shown) for opening and closing an electrical circuit 30 (FIG. 2).

The output of threshold-setting means 25 provides for selecting between two modes of operation of pressure and venting communication paths 35. In one of these modes of operation, there is provided a pressure communication path, and in the other mode, there is provided a venting communication path. While the pressure communication path is open, vacuum modulator 6 is responsive to intake manifold pressure, the venting communication path being closed under such circumstances. While the venting communication path is open, load port 7 of vacuum modulator 6 is simply vented to the atmosphere, preferably through a filter 37 (FIG. 2). The pressure communication path is interrupted during this latter mode of operation.

Many different types of components have suitable characteristics for performing the functions of the threshold-setting means and of the controllable means for defining the communication paths. Differential pressure type sensors having suitable characteristics for use as the threshold-defining means include vacuum-type or positive pressure type pressure switches, whether of the normally open or normally closed type, and include fluid logic devices such as a fluid logic poppet valve which includes among other things, a pilot air port for use in a pressure comparison operation. In this pressure comparison operation, the poppet valve responds to a reference pressure and compares it against a pressure signal applied to the device through another port. A relatively inexpensive and advantageous component is a pressure switch manufactured by Thomas G. Faria Corporation, Uncasville, Connecticut, and designated E7 2910-1. This component includes a normally closed electrical switch that opens when the pressure applied to its sensing port is slightly negative (i.e., approximately 0.5–1.0 in. Hg below atmospheric pressure) and closes at 0.5–0.3 in. Hg. As for components suitable for use as the controllable means, there are commercially available many different solenoid valves commonly referred to as "three-way" valves.

In a specific embodiment depicted in FIGS. 2 and 3, a case 40 contains, among other things, pressure switch 27 and a solenoid valve 42. One wall 44 of case 40 extends to define wing-like flanges 46 in which mounting holes 48 are provided for use in securing the accessory within the vehicle engine compartment. A wall 50, opposite from wall 44, defines a heat sink portion to aid in dissipating heat generated by solenoid valve 42 while it is actuated.

As can be best seen in FIG. 2 owing to the representation of wall 44 in phantom lines, a side wall 52 has access holes including an access hole through which a coupling member 54 extends. At one of its ends, coupling member 54 defines inlet port 12; its opposite end is threaded and is connected to a T-fitting 56 that is also connected between pressure switch 27 and solenoid valve 42. Another one of the access holes supports a fuse holder 58, and another one supports a grommet-like bulkhead type electrical connector 60 through which wires 61 and 62 of circuit 30 extend.

Wire 61 is electrically connected to the ground side of the vehicle battery 63. Wire 62 is electrically connected to the ignition switch 65 such that no current can flow in circuit 30 unless the ignition switch is on.

A portion of solenoid valve 42 projects out of case 40 through an access hole in an end wall 67. A coupling member 69, at one of its ends, defines outlet port 16; at its opposite end, it is threaded and connected into solenoid valve 42. A vent filter 37 is similarly connected into solenoid valve 42 and defines exhaust port 18.

The embodiment depicted in FIGS. 2 and 3 does not require a pressure regulator because of certain relatively high pressure ratings of pressure switch 27 and solenoid valve 42. In particular, pressure switch 27 is a miniature, vacuum-type pressure switch manufactured by the Thomas G. Faria Corporation, Uncasville, Connecticut, under the designation E7 2910-1. This pressure switch is capable of withstanding positive pressure substantially higher than the maximum intake manifold pressure even under backfire conditions. Solenoid valve 42 is a three-way, normally open valve capable of blocking at least 50 psi of positive pressure, and is manufactured by Gould, Inc., Allied Control Division, Plantsville, Connecticut under the designation 2-BB-HB-RV-SV 30483 12VDC.

In operation, the intake manifold pressure is, under normal drive conditions of the vehicle, less than atmospheric, and increases above atmospheric only during those peak power periods of vehicle operation in which turbocharger 8 substantially boosts the intake manifold pressure. Owing to the coupling of inlet port 12 to the source port, pressure switch 27 senses the level of the intake manifold pressure. A pressure communication path is defined during normal drive conditions between inlet port 12 and outlet port 16. This is so because the internal electrical switch within pressure switch 27 remains open owing to the relatively low intake manifold pressure, whereby no electric current flows in circuit 30 with the result that solenoid valve 42 is in its normally open condition. During peak power conditions, the intake manifold pressure exceeds the actuation point of pressure switch 27, thereby causing its internal electrical switch to close circuit 30. Under the control of the electric current flowing in circuit 30, solenoid valve 42 closes, thereby interrupting the pressure communication path and providing instead a venting communication path between outlet port 16 and exhaust port 18. Thus, the vacuum modulator does not have applied to it the problem-causing high positive pressure developed during the peak power periods, thereby eliminating the undesirable side effects described above.

I claim:

1. An accessory for a vehicle having an automatic transmission vacuum modulator control unit, an engine with an intake manifold, and means for causing the intake manifold pressure to temporarily exceed atmospheric pressure, the intake manifold and the control unit respectively having a source port and a load port for use in coupling the intake manifold to the control unit, the accessory comprising:
   controllable means for normally providing a communication path for use in coupling the source port to the load port; and
   pressure comparison means responsive to the intake manifold pressure and to a reference pressure for causing the controllable means to interrupt the communication path when the intake manifold pressure exceeds the reference pressure.

2. An accessory according to claim 1, wherein the controllable means includes means operative while the communication path is interrupted for venting the load port to the atmosphere.

3. An accessory according to claim 1, wherein the controllable means includes a valve having a first operating mode in which the valve defines the communication path and having a second operating mode in which the valve interrupts the communication path and provides a venting path for coupling the load port to the atmosphere.

4. An accessory according to claim 3, wherein the valve is a solenoid valve, and wherein the pressure comparison means includes switching means for selectively coupling energization current to the solenoid valve.

5. An accessory according to claim 4, wherein the pressure comparison means comprises a pressure switch.

6. An accessory for a vehicle having an automatic transmission vacuum modulator control unit, an engine with an intake manifold, and means for causing the intake manifold pressure to temporarily exceed atmospheric pressure, the intake manifold and the control unit respectively having a source port and a load port for use in coupling the intake manifold to the control unit, the accessory comprising:
   an inlet port for coupling to the source port;
   an outlet port for coupling to the load port;
   an exhaust port;
   controllable means for selectively providing a pressure communication path between the inlet and outlet ports during a first mode of operation and for providing a venting communication path between the outlet and exhaust ports during a second mode of operation; and
   threshold-setting means responsive to the intake manifold pressure for causing the controllable means to operate in the first mode of operation while the intake manifold pressure is less than a predetermined pressure threshold and to operate in the second mode of operation while the intake manifold pressure is greater than a predetermined pressure threshold.

7. An accessory according to claim 6, wherein the controllable means comprises a solenoid valve and wherein the threshold-setting means comprises a pressure switch.

8. An accessory according to claim 7, and further comprising a pressure regulator for coupling between the inlet port and the pressure switch.

9. An accessory according to claim 7, wherein the pressure switch defines a pressure threshold that is less than atmospheric.

10. An accessory according to claim 7, and further comprising a case for containing the pressure switch and the solenoid valve, the case having a heat-sink portion for dissipating heat generated by the solenoid valve.

* * * * *